C. KNOTT.
TRACTOR.
APPLICATION FILED DEC. 5, 1917.
1,341,428. Patented May 25, 1920.
6 SHEETS—SHEET 1.
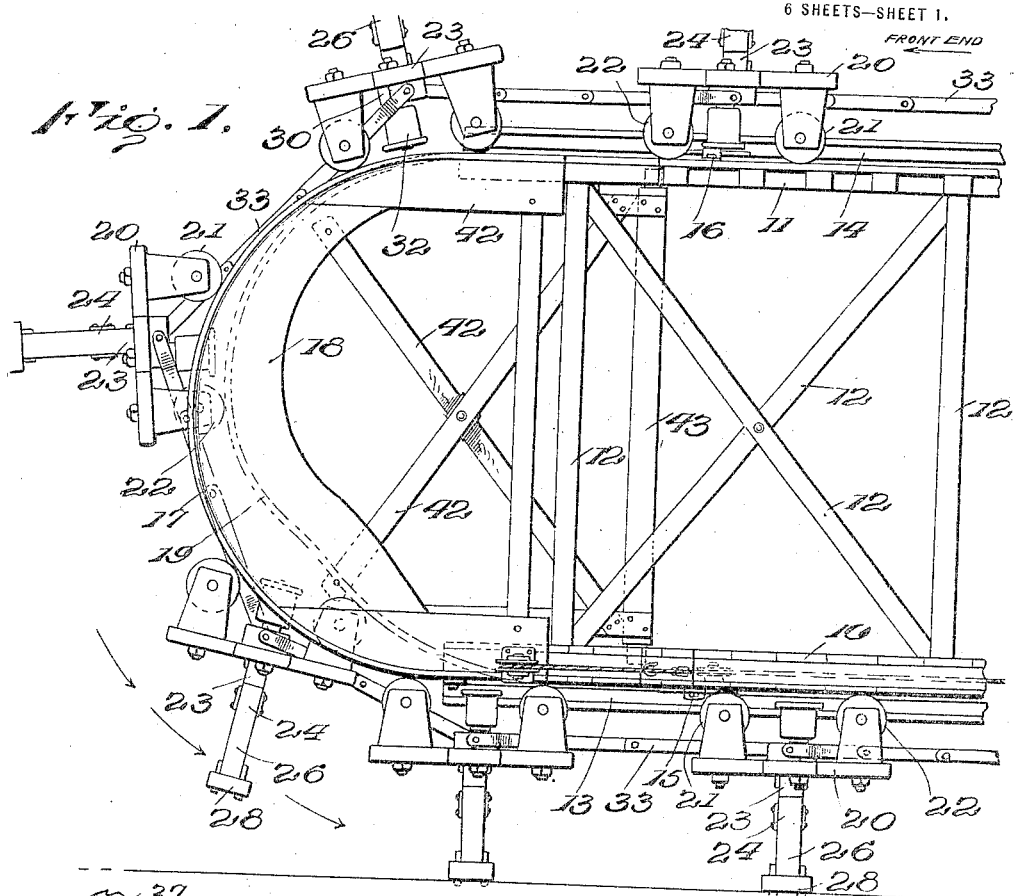
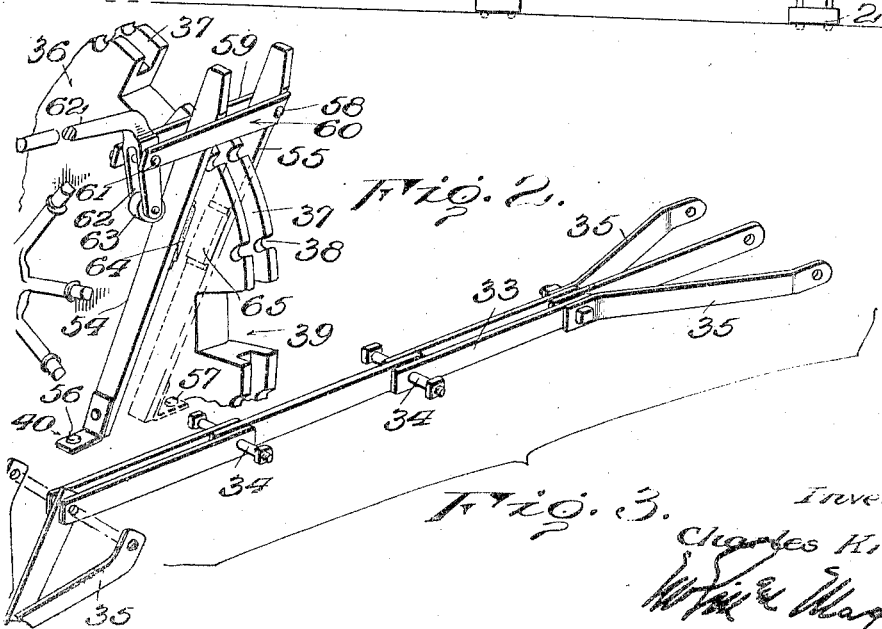

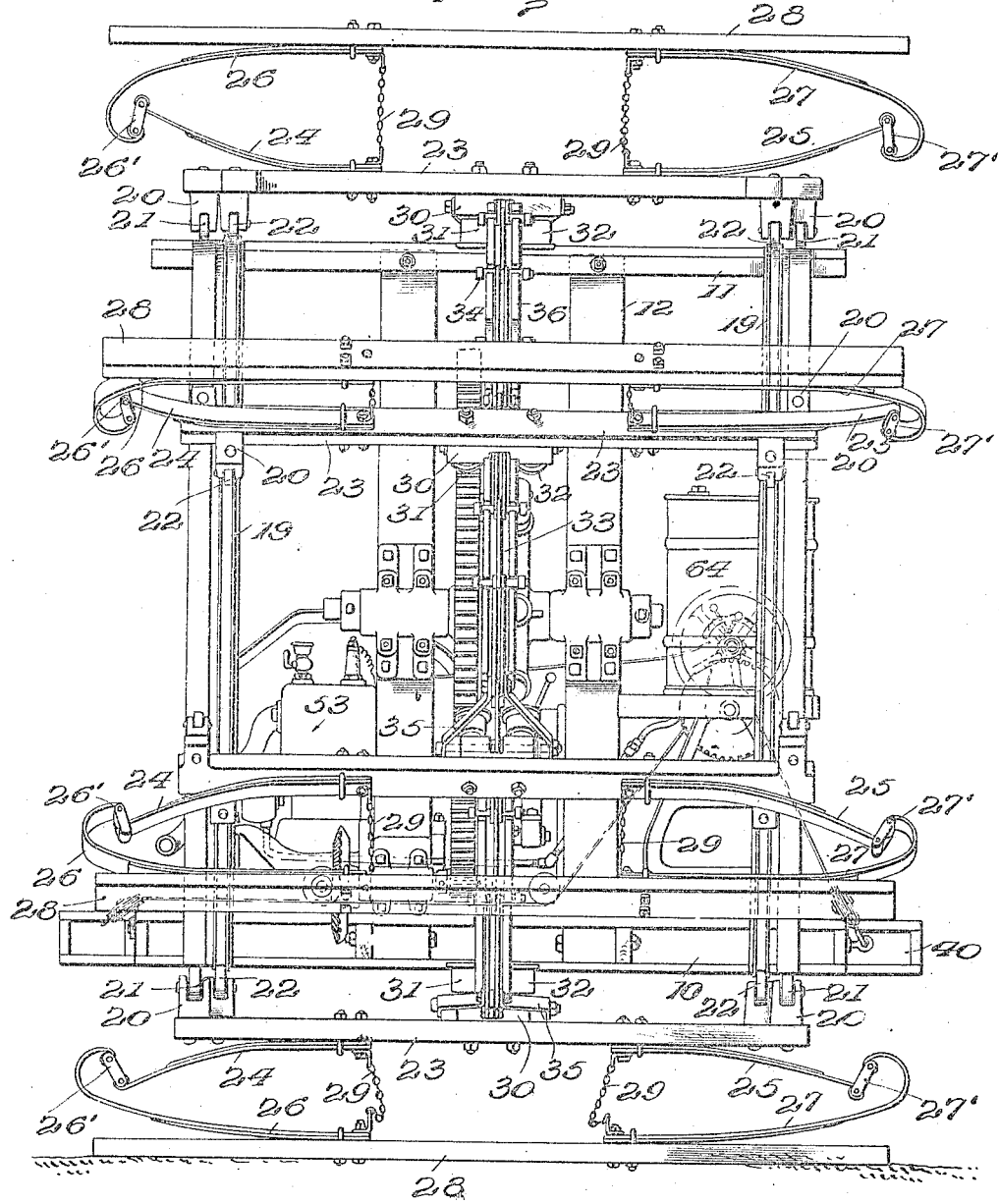

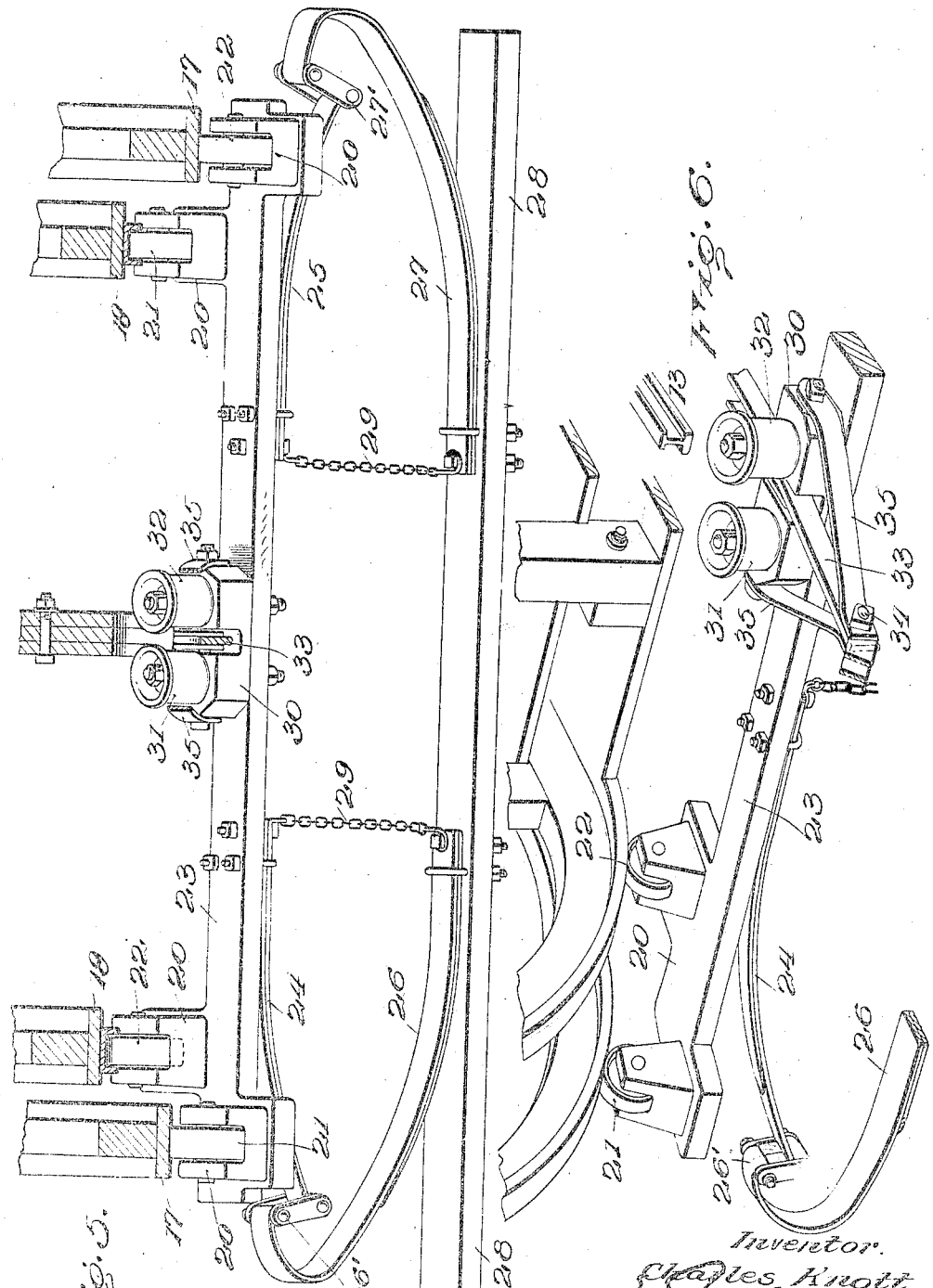

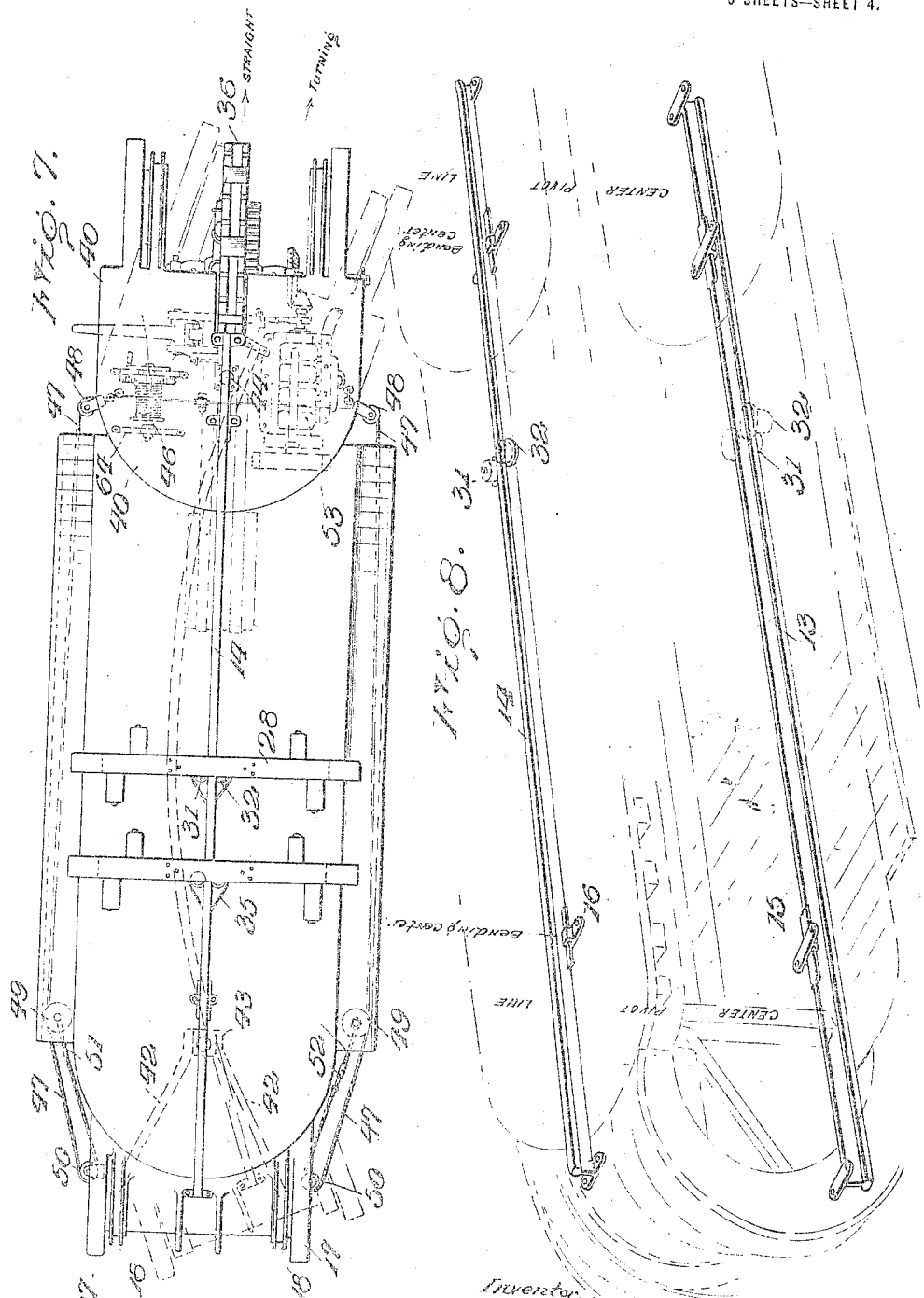

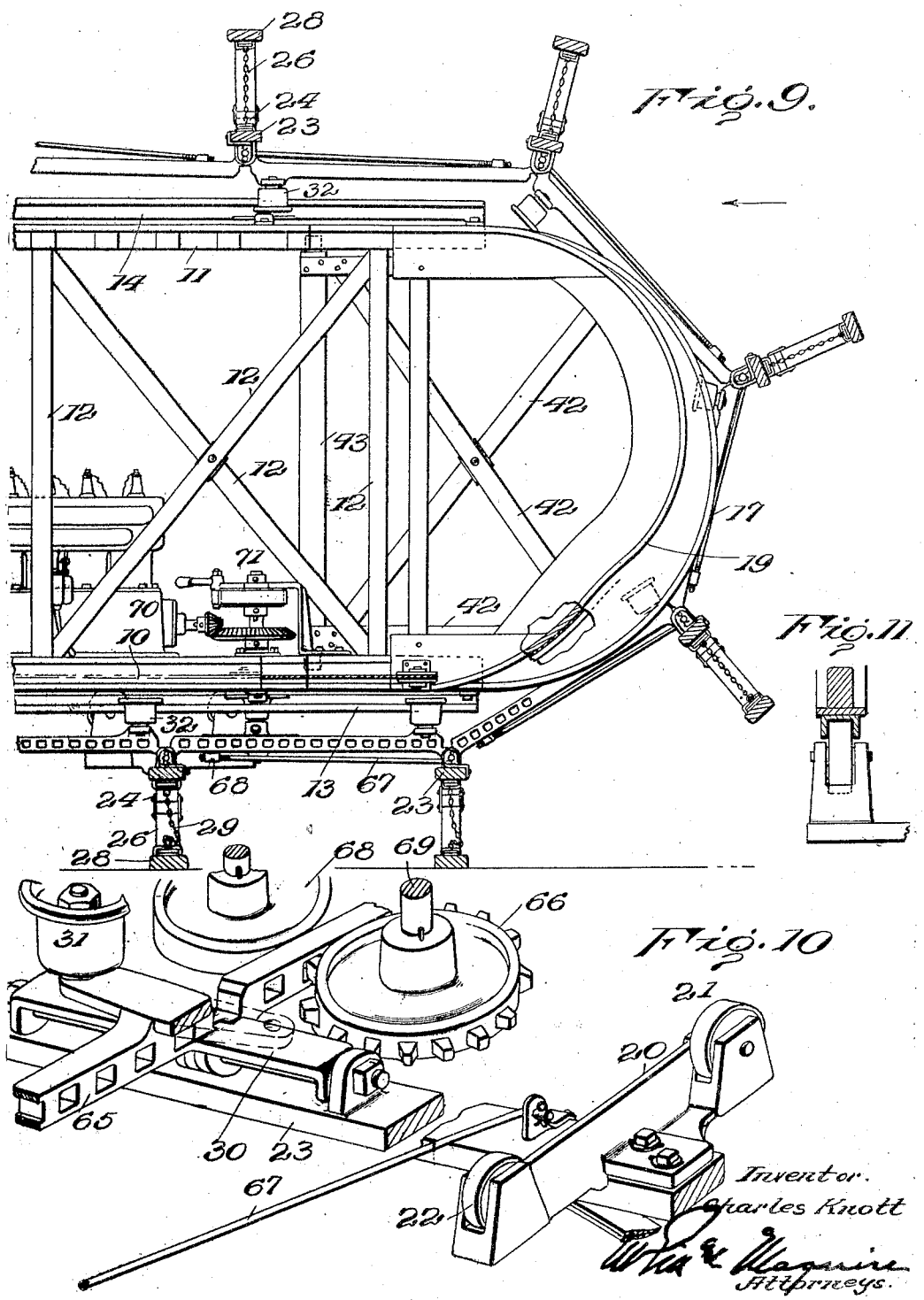

C. KNOTT.
TRACTOR.
APPLICATION FILED DEC. 5, 1917.
1,341,428.
Patented May 25, 1920.
6 SHEETS—SHEET 6.
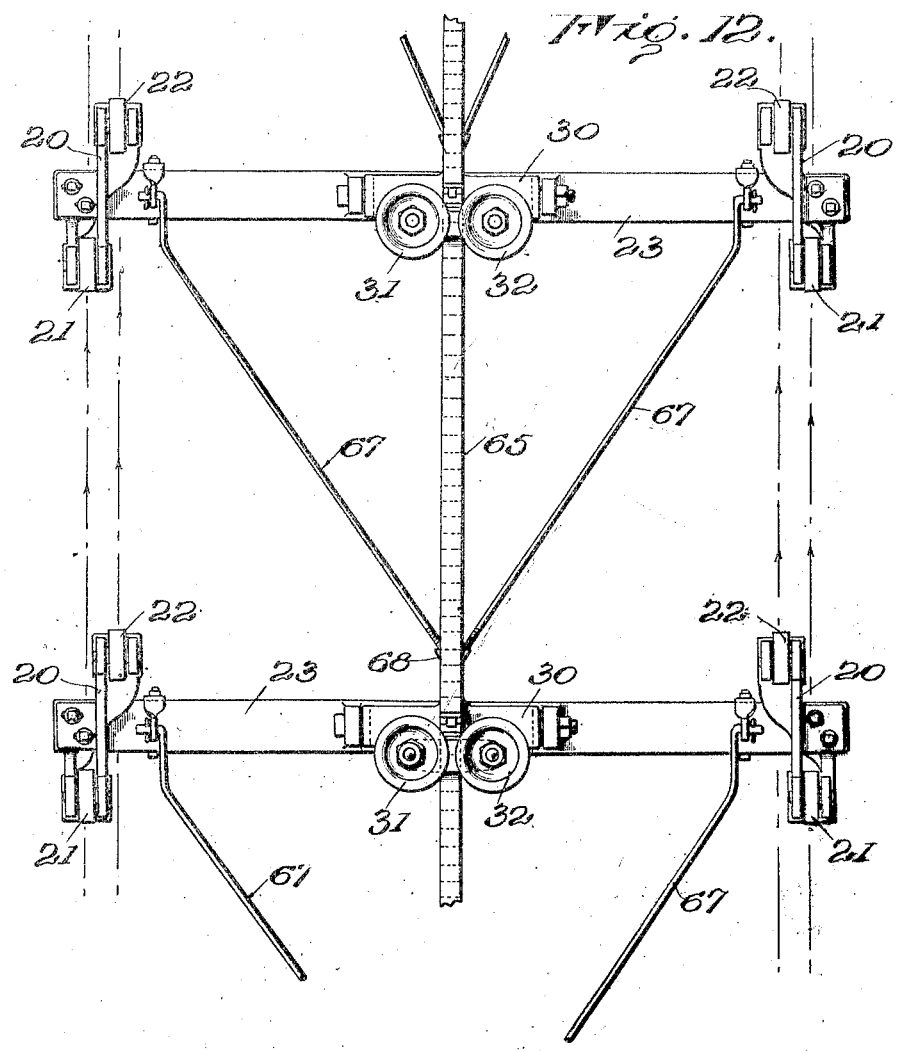
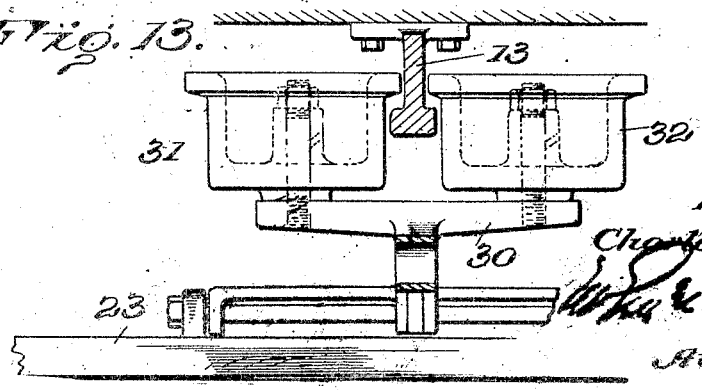
Inventor.
Charles Knott
Attorneys

UNITED STATES PATENT OFFICE.

CHARLES KNOTT, OF NEW MADRID, MISSOURI.

TRACTOR.

1,341,428.

Specification of Letters Patent.

Patented May 25, 1920.

Application filed December 5, 1917. Serial No. 205,644.

*To all whom it may concern:*

Be it known that I, CHARLES KNOTT, of New Madrid, in the county of New Madrid and State of Missouri, have invented certain new and useful Improvements in Tractors; and I do hereby declare the following to be a full, clear, and exact description of the invention, such as will enable others skilled in the art to which it appertains to make and use the same.

My primary purposes are to provide an improved single belt tractor and steering means, and also improved springs for the trucks.

The apparatus comprises, in general, a main supporting frame including a platform to support the operating motor and steering machinery, coacting guide tracks, an endless belt of ground engaging trucks operated by the motor on the platform, and relatively stiff guide rails adapted to be deflected laterally by powerful mechanism, to steer the apparatus and cause it to turn or to move along curved lines. The rails possess sufficient rigidity to hold the body in proper place on the ties, but yield to the force exerted by the deflecting mechanism, and automatically return to normal position when the force is removed.

In the drawings, Figure 1 is a side view of the front portion of the apparatus; Fig. 2 is a perspective detail of a portion of the brake mechanism; Fig. 3 is a detached perspective view of a portion of the coupling devices between the trucks; Fig. 4 is a rear elevation on an enlarged scale; Fig. 5 is an elevation on an enlarged scale illustrating the construction of one of the trucks, and its attaching means; Fig. 6 represents parts of one of the truck attaching means, in perspective; Fig. 7 is a plan view illustrating the arrangement of the steering apparatus; Fig. 8 is a detached perspective view of the resilient rails; Fig. 9 is a plan view of the rear portion illustrating modifications in the construction; Fig. 10 shows perspective details of the construction of portions of the modified arrangement of Fig. 9: Fig. 11 is a sectional detail of the guide-track; Fig. 12 is a plan view of portions of the modified structure shown in Figs. 9 and 10: Fig. 13 is an enlarged detail of portions of the apparatus shown in Fig. 10.

The apparatus comprises a base or supporting frame, including a lower platform 10, upper platform 11, and connecting struts or braces 12, the portions 10—11 being in spaced relation and thus providing storage space for the engine, fuel tanks, freight, etc.

Extending longitudinally of the frame is a lower rail 13 and an upper rail 14, the rails being preferably sections of light gage railway rails. The rails 13—14 are attached, at 15—16, to the platforms 10—11 which hold the rails from movement laterally relatively to the platforms but permit slight endwise movement.

Connected to the platforms 10—11 by the ends of the rails and the pivoted posts 43—44 are end members, which have two pairs of tracks, one pair near each side. One track 17 of each pair is symmetrically curved at the front end and of eccentric curvature at the rear end, and the other track 18 of each pair is curved eccentrically at the front end and symmetrically at the rear end, each shorter portion having an inwardly curving or eccentric section 19 to space the ties uniformly as they engage or leave the ground.

Mounted for movement on the tracks 17—18 and guide rails 13—14 is a plurality of carriers or trucks each comprising a support 20 carrying two bearing pulleys 21—22 adapted to bear respectively against the tracks 17—18 and platforms 10—11. The supports 20 are arranged in opposite pairs and connected by beam 23. Coupled to each beam are leaf springs 24—25, the springs in turn being coupled to lower leaf springs 26—27 by double laterally swinging link hinges 26'—27', the hinges permitting of the changing relation of the guide rails to the ties 28 when making a turn. The springs 26—27 are coupled to the ties 28 which constitute the tread surfaces.

Check chains 29 are shown connected to the beams 23 and ties 28 to prevent excessive spreading when the tie is free of the ground. Mounted centrally on each of the beams 23 is a base member 30 which supports guide rollers 31—32 bearing against each side of the rails 13—14.

The supports 30 are recessed between the bearings of the rollers 31—32, and extending through these recesses is a jointed member formed of a plurality of relatively long links 33 pivotally united at 34, thus forming an endless chain-like structure. Each of the members 30 is coupled to one of the links 33 by straps or hounds 35. The pivots 34 are extended laterally as shown in Fig. 3 for engaging the driving wheel 36.

The driving wheel is mounted for rotation upon the rear framework of the apparatus, a portion of it being shown at 36 in Figs. 2, 4, and 7, the wheel having a peripheral channel 37 to receive the links 33 of the chain and with transverse recesses 38 to receive the projecting pivots 34 and thus assist in advancing the chain when the wheel is revolved. The rotating wheel 36 is also provided with larger recesses 39 at intervals to receive the rollers 31—32 as the chain is rotated.

The steering mechanism is illustrated in Fig. 7 and includes supplemental front and rear platforms, the rear one of which is represented at 40, and shown pivotally supported at 44 to the framework, with the rails 13—14 coupled thereto, so that as the platform is oscillated the rails will be deflected laterally.

At the forward end of the apparatus, supporting frames, one of which is represented at 42, are fastened at their rear converging ends to the pivoted post 43 and at their forward diverging ends to the tracks 17—18.

Mounted upon the rear platform 40 is a winding drum 46 from which pull cables 47 lead over guide pulleys 48 and 49 and thence around guide pulleys 50 on the front swinging frame and back to the platform to which they are attached at 51. The cables 47 pass through guide devices on the platform 10 and one is provided with a turn buckle, represented at 52, to control the tension.

The motor, indicated at 53, is coupled by suitable gearing to drive the wheel 36.

A suitable brake mechanism is attached to the rear platform 40, as illustrated in Fig. 2, and comprises standards 54—55, and attaching members 56—57 connecting the members 54—55 to the platform. The attaching members are resilient, and hold the members 54—55 yieldably spaced from the side faces of the wheel 36. Pivoted at 58 are straps 59—60, the latter extending in advance of the standard 54. Pivoted at 61 between the free ends of the straps 59—60 is a bell crank lever 62 having a bearing roller 63 in one of its arms adapted to bear against the standard 54. Brake shoes 64—65 are attached to the confronting faces of the standards 54—55 and bear against the side faces of the wheel 36. The attaching devices 56—57 being of resilient material normally maintain the shoes 64—65 in spaced relation to the wheel 36, and when the lever 62 is actuated, the coaction of the straps 59—60 and the roller 63 will compress the shoes against the wheel 36.

The motion of the motor 53 is communicated to the wheel 36 and thence transmitted to the chain device 33 to which the ties or ground engaging members 28 are coupled through the medium of the springs 24—26, the beams 23, the blocks 30 and the straps 35, the larger recesses 39 clearing the bearing rollers 31—32 and the smaller recesses 38 engaging the projecting portions of the pivot bolts 34 of the chain, consecutively, by which means the apparatus is caused to travel over the ground.

The rollers 21—22 traveling over the tracks 16—17 carry the belt of trucks around the curved ends of the tracks as the chains are operated.

The guide-rollers 31—32 are consecutively engaged with the opposite sides of the rail 13 at the lower and rearward portion of the movement of the travelers, and with the upper rail 14 at the forward movement. At the same time the rollers 21 run continuously in contact with the tracks 17, or the body 10—11 while the rollers 22 run continuously in contact with the frame 10—11 or over the tracks 18.

As the bearing ties 28 successively engage the ground, the eccentric sections 19 of the tracks permit the trucks to tilt so as to give the ties equal spacing when the machine is loaded or when running over uneven ground. An operating wheel 64 is connected to the winding drum 46. To change the direction of the apparatus, the steering wheel is operated to cause the pull cables 47 to move the yoke frame 42, carrying the tracks 17—18, laterally against the resistance of the rails 13—14 and thus deflect the latter to the right or left and cause the rollers 31—32 to correspondingly deflect the ties 28 and their attachments as indicated by dotted lines in Fig. 7. When the winding drum 46 is released, the resiliency of the rails 13—14 cause them to return to normal position and restores the parts associated therewith to correspondingly normal position.

In Figs. 9 to 12, modifications in the construction of certain parts are illustrated. These consist principally in substituting notched bars 65 for the links 33 and the pins 34, and substituting gear wheel 66 for the wheel 36 to engage the notches of the bars. In this modified arrangement, in addition to the hinged center connection, brace rods or hounds 67 are employed to connect the bars 65 to the beams 23 to hold them in positive alinement.

In the modified structure, the large power wheel 36 is dispensed with and the tracks 17—18 only depended on to carry the belt of trucks around the ends, the relatively small gear 66 only being employed to engage the notches of the members 65 to actuate the belt.

A roller 68 will be arranged to bear against the members 65 as they are moved past the gear 66, to hold the gear and bars in operative engagement.

The shaft 69 on which the gear 66 is keyed, is operated by a motor 70 and is provided with a band brake 71.

The platform 10 may be made with a water-tight body so that it can cross bodies of water, the movement of the trucks through the water furnishing the propelling power and steering by means of the turning ends of the machine.

While I prefer to use the springs shown between the transverse beams 23 and the ties 28, especially for heavy tractors, yet these springs and ties may be omitted and the transverse beams alone constitute the tread surfaces, without departing from the spirit of my invention.

I claim as my invention:

1. In a tractor, a body having a frame adapted to swing, and flexible rails, a plurality of trucks having ties constituting tread surfaces, said trucks having supports including pulleys movable over said frame and body and having rollers contacting with said flexible rails.

2. In a tractor, a plurality of trucks having ties constituting tread surfaces, said trucks having supports including pulleys, beams connecting opposite pairs of supports, and a chain drive connected with said beams at their centers.

3. In a tractor, a plurality of ties having transverse beams, guide rollers on said beams, a chain drive movable between said rollers comprising links pivotally connected together, and means for advancing said chain.

4. In a tractor, the combination with an endless series of ties having cross-beams, and rollers thereon, and a chain connecting and advancing said ties, said chain having links, and pivot pins connecting said links, of a drive wheel for operating said chain, said wheel having a peripheral channel to receive said links, a series of transverse grooves to receive said pivot pins, and a second series of transverse grooves to receive said rollers.

5. In a tractor, a series of trucks, each of said trucks having a cross-beam, a pair of leaf springs secured to the undersides of each of said beams, a second pair of leaf springs, a tie secured to said second pair of springs and pivoted links connecting the two pairs of springs.

6. In a tractor, a series of trucks, each of said trucks having a cross-beam, a pair of leaf springs secured to the undersides of each of said beams, a second pair of leaf spring, a tie secured to said second pair of springs, pivoted links connecting the two pairs of springs, and check chains connecting said beams to said ties to limit the movement of the latter.

7. In a tractor, a body having front and rear platforms, a rail connecting said platforms and body, and means for swinging said platforms to steer the vehicle, said rail being resilient to conform to the curvature described by the platforms in turning.

8. In a tractor, a series of trucks, each of said trucks having a cross beam, a pair of leaf springs secured to the undersides of each of said beams, a second pair of leaf springs, a tie secured to said second pair of springs, and swinging connections between the two pairs of springs.

In testimony whereof I have signed this specification.

CHARLES KNOTT.